United States Patent
Wu et al.

(10) Patent No.: US 10,822,244 B2
(45) Date of Patent: Nov. 3, 2020

(54) METHOD FOR SYNTHESIZING NANO SAPO-34 MOLECULAR SIEVE, AND SAPO-34 MOLECULAR SIEVE CATALYST AND APPLICATION THEREOF

(71) Applicant: DALIAN INSTITUTE OF CHEMICAL PHYSICS, CHINESE ACADEMY OF SCIENCES, Dalian (CN)

(72) Inventors: Pengfei Wu, Dalian (CN); Miao Yang, Dalian (CN); Peng Tian, Dalian (CN); Zhongmin Liu, Dalian (CN); Linying Wang, Dalian (CN); Lin Liu, Dalian (CN)

(73) Assignee: DALIAN INSTITUTE OF CHEMICAL PHYSICS, CHINESE ACADEMY OF SCIENCES, Dalian (CN)

( * ) Notice: Subject to any disclaimer, the term of this patent is extended or adjusted under 35 U.S.C. 154(b) by 65 days.

(21) Appl. No.: 16/321,118

(22) PCT Filed: Aug. 2, 2016

(86) PCT No.: PCT/CN2016/092827
§ 371 (c)(1),
(2) Date: Jan. 28, 2019

(87) PCT Pub. No.: WO2018/023365
PCT Pub. Date: Feb. 8, 2018

(65) Prior Publication Data
US 2019/0169035 A1    Jun. 6, 2019

(51) Int. Cl.
*C01B 39/54* (2006.01)
*B01J 29/85* (2006.01)
(Continued)

(52) U.S. Cl.
CPC ............... *C01B 39/54* (2013.01); *B01J 29/85* (2013.01); *B01J 37/0018* (2013.01); *B01J 37/08* (2013.01);
(Continued)

(58) Field of Classification Search
CPC ........ C01B 39/54; C01P 2002/72; B01J 29/85; B01J 29/7015
See application file for complete search history.

(56) References Cited

U.S. PATENT DOCUMENTS

| | | | | |
|---|---|---|---|---|
| 2009/0149313 A1* | 6/2009 | Liu | ...................... | B01D 69/148 502/4 |
| 2016/0167030 A1* | 6/2016 | Levy | ...................... | C01B 39/54 540/464 |
| 2019/0169035 A1* | 6/2019 | Wu | ...................... | B01J 37/08 |

FOREIGN PATENT DOCUMENTS

| CN | 102992339 A | 3/2013 |
|---|---|---|
| CN | 103523797 A | 1/2014 |

(Continued)

OTHER PUBLICATIONS

English translation of International Search Report dated Mar. 13, 2017 and Written Opinion of corresponding International application No. PCT/CN2016/092827; 5 pgs.

(Continued)

*Primary Examiner* — David M Brunsman
(74) *Attorney, Agent, or Firm* — Maier & Maier, PLLC

(57) ABSTRACT

A method for synthesizing a nano SAPO-34 molecular sieve, and an SAPO-34 molecular sieve catalyst and application thereof. A nano SAPO-34 molecular sieve is synthesized by adding a microporous templating agent and a templating agent having a functionalized organic silane to hydrothermal synthesis. The nano SAPO-34 molecular sieve is calcined to obtain a nano SAPO-34 molecular sieve catalyst. The catalyst can be used in a reaction for preparing (Continued)

low-carbon olefin from an oxygen-containing compound. The nano SAPO-34 molecular sieve obtained by this method has a pure CHA crystal phase. Moreover, the nano SAPO-34 molecular sieve catalyst obtained by this method has good catalytic performance in a MTO reaction, the service life of the catalyst is significantly prolonged, and the selectivity of the low-carbon olefin is improved.

16 Claims, 2 Drawing Sheets

(51) Int. Cl.
    *B01J 37/00*    (2006.01)
    *B01J 37/08*    (2006.01)

(52) U.S. Cl.
    CPC ...... *C01P 2004/03* (2013.01); *C01P 2004/64* (2013.01)

(56) References Cited

FOREIGN PATENT DOCUMENTS

| | | |
|---|---|---|
| CN | 104355316 A | 2/2015 |
| CN | 104556143 A | 4/2015 ke |
| WO | 03/048042 A1 | 6/2003 |
| WO | 2014/047800 A1 | 4/2014 |

OTHER PUBLICATIONS

Lei Xu et al. "Synthesis of SAPO-34 with only Si(4Al) species: Effect of Si contents on Si incorporation mechanism and Si coordination environment of SAPO-34", Microporous and Mesoporous Materials, vol. 115, Issue 3, Available online Feb. 10, 2008, pp. 332-337, 6 pgs.

European Search Report dated Apr. 28, 2020, in corresponding European application No. 16910963.4; 13 pages.

Wang et al., "Dual template-directed synthesis of SAPO-34 nanosheet assemblies with improved stability in the methanol to olefins reaction", Journal of Materials Chemistry A, 2015, vol. 3, pp. 5608-5616, DOI: 10.1039/c4ta06124a.

Sun et al., "Organosilane surfactant-directed synthesis of hierarchical porous SAPO-34 catalysts with excellent MTO performance", ChemComm, vol. 50, 2014, pp. 6502-6505, DOI: 10.1039/c4cc02050b.

Sun et al., "Electronic Supplementary Information (ESI) Organosilane surfactant-directed synthesis of hierarchical porous SAPO-34 catalysts with excellent MTO performance", The Royal Society of Chemistry 2014, 2014, pp. 1-11.

\* cited by examiner

METHOD FOR SYNTHESIZING NANO SAPO-34 MOLECULAR SIEVE, AND SAPO-34 MOLECULAR SIEVE CATALYST AND APPLICATION THEREOF

This application is a 371 filing of PCT/CN2016/092827 filed Aug. 2, 2016

FIELD

The present invention refers to the field of molecular sieves, in particular to a method for synthesizing nano SAPO-34 molecular sieve, a SAPO-34 molecular sieve catalyst and application thereof.

BACKGROUND

The silicoaluminophosphate molecular sieve (SAPO-n) is various in skeleton structure, and its three dimensional skeleton structure is composed of $PO_2^+$, $AlO_2^-$ and $SiO_2$ tetrahedrons. The silicon atoms isomorphously replace part of the P atoms in neutral aluminum phosphate skeleton structure or simultaneously replace P and Al atoms, which makes the skeleton produce net negative charges and causes proton acidity, thus giving the SAPO molecular sieves an acid catalytic performance.

Among them, the SAPO-34 molecular sieve with a CHA topology has been successfully applied in the commercialization of methanol-to-olefin (MTO), due to its excellent catalytic performance in MTO reaction. However, the intrinsic microporous structure of SAPO-34 limits the mass transfer efficiency, resulting in a low utilization rate of active sites of the SAPO-34 catalyst, which leads to channel blockage and carbon deposition deactivation. To solve this problem, the SAPO-34 molecular sieve with a mesoporous-microporous composite structure were synthesized. By introducing mesoporous or macroporous channels among the intrinsic microporous structures or preparing small grains of nano-sized molecular sieve, the mass transfer resistance during reaction was reduced, the molecular diffusion performance during reaction was improved, and the reacting life for catalytic reaction and selectivity to low-carbon olefins were improved.

Triethylamine is an inexpensive and readily available structure-directing agent or template for the synthesis of SAPO-34 molecular sieve. However, when triethylamine is used as a single template, the synthesized product is usually an eutectic crystal of SAPO-34/-18 (CHA/AEI) containing a small amount of SAPO-18. When the silicon content in the synthetic gel is very low or no silicon, a SAPO-18 or AlPO-18 will even be obtained (Micorporous Mesoporous Materials, 2008, 115, 332-337). In addition, the SAPO-34 molecular sieve directed with triethylamine has a larger particle size (3~5 μm), which limits the molecular mass transfer process in MTO reaction. These are not beneficial to obtaining excellent MTO catalytic reaction results.

SUMMARY

In view of the existing situation above, an object of the present invention is to provide a new method for synthesizing nano SAPO-34 molecular sieve to overcome one or more defects in the prior art.

To this end, the present invention provides a method for synthesizing nano SAPO-34 molecular sieve, wherein synthesizing the nano SAPO-34 molecular sieve by hydrothermal method in the presence of a functionalized organosilane, the functionalized organosilane having the structure shown in Formula I:

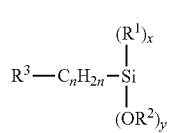

Formula I wherein n is an integer of 1~16; $R^1$ is a $C_{1~10}$ alkyl group; $R^2$ is a $C_{1~6}$ alkyl group; $R^3$ is a diethylamino, triethylamino, piperazinyl, pyridyl or morpholinyl group; x is an integer of 0~2, y is an integer of 1~3, and x+y=3.

In a preferred embodiment, in the Formula I, n is an integer of 3~8; $R^1$ and $R^2$ are each independently a $C_{1~4}$ alkyl group; $R^3$ is a piperazinyl, pyridyl or morpholinyl group.

In a preferred embodiment, the method comprises the following steps:

a) dissolving the functionalized organosilane in water, and then adding sequentially an aluminum source, a phosphorus source, an organic amine and an additional silicon source to obtain a mixture with the following molar ratio:
$SiO_2:P_2O_5:Al_2O_3$:organic amine:$H_2O$=0.2~1.2:0.5~1.5: 0.6~1.4:1.5~5.5:50~200;

b) crystallizing the mixture obtained from step a) for 0.4~10 days at 150~220° C.;

c) after the crystallization of step b), separating the solid product, and washing and drying it to obtain the nano SAPO-34 molecular sieve.

In a preferred embodiment, the molar ratio of the functionalized organosilane to the additional silicon source in the mixture obtained from step a) is 1~55:10, based on the molar number of $SiO_2$.

In a preferred embodiment, in step a), the phosphorus source is one or more selected from orthophosphoric acid, metaphosphoric acid, phosphate and phosphite; the aluminum source is one or more selected from aluminum salt, active alumina, alkoxy aluminum and metakaolin; the additional silicon source is one or more selected from silica sol, active silica, orthosilicate and metakaolin.

In a preferred embodiment, in step a), the organic amine is one or more selected from triethylamine, tetraethylammonium hydroxide, morpholine, diethylamine, di-n-propylamine and diisopropylamine.

In a preferred embodiment, in step a), the organic amine is triethylamine.

In a preferred embodiment, in step b), the time for the crystallization is 1~7 days.

In another aspect, the present invention provides a SAPO-34 molecular sieve catalyst, wherein the SAPO-34 molecular sieve catalyst is obtained by calcining the nano SAPO-34 molecular sieve synthesized according to the above-described method in air at 400~700° C.

In yet another aspect, the present invention provides the application of the SAPO-34 molecular sieve catalyst in the conversion of oxygenated compounds to low-carbon olefins, wherein the oxygenated compounds are $C_{1~4}$ alcohols and the low-carbon olefins are $C_{2~6}$ olefins.

The advantageous effects of the present invention include but are not limited to:

(1) the nano SAPO-34 molecular sieve obtained by the method of the present invention has a small primary particle size (about 50 nm~200 nm), a large external specific surface area (about 80 m²/g~100 m²/g) and a large mesoporous volume (about 0.10 m³/g~0.25 m³/g);

(2) the nano SAPO-34 molecular sieve obtained by the method of the present invention has a pure CHA crystal phase;

(3) the SAPO-34 molecular sieve catalyst obtained by the method of the invention exhibits an excellent catalytic performance in MTO reaction, of which the service life is significantly prolonged and the selectivity to low-carbon olefins is improved.

DETAILED DESCRIPTION

Figure 1:
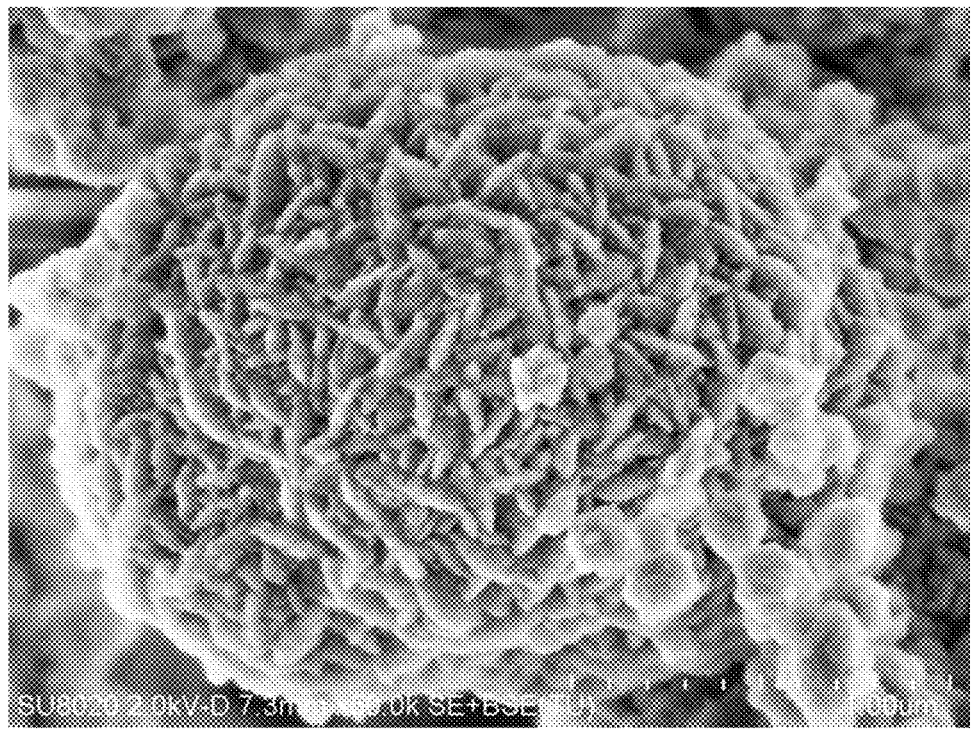
FIG. 1 is a SEM image of the nano SAPO-34 molecular sieve sample obtained according to Example 1 of the present application.

According to one aspect, the present application provides a method for synthesizing nano SAPO-34 molecular sieve by hydrothermal method with assistance of a functionalized organosilane. The functions of the functionalized organosilane in the synthesis are at least in the following three aspects: 1) as a crystal growth inhibitor to reduce crystal size; 2) as an organic silicon source; 3) the functional groups of the functionalized organosilane have partly a structure-directing effect to inhibit the SAPO-18 eutectic crystal produced by using such as triethylamine as a microporous template, and thus the nano SAPO-34 molecular sieve with a pure CHA crystal phase is successfully synthesized.

In the present invention, the obtained nano SAPO-34 molecular sieves are usually an aggregate of nanoparticles.

In the present invention, the functionalized organosilane is selected from at least one of the alkoxy organosilane compounds containing diethylamino, triethylamino, piperazinyl, pyridyl or morpholinyl groups. Among them, the alkoxy organosilane may generally be regarded as an organosilicon compound composed of silicon atoms directly connected with 1~4 alkoxy groups. The diethylamino group is a group obtained by losing hydrogen atom on the nitrogen atom in diethylamine molecule. The triethylamino group is a group obtained by losing hydrogen atom on the nitrogen atom in triethylamine molecule. The piperazinyl group is a group obtained by losing hydrogen atom on a nitrogen atom in the six-membered cyclic piperazine molecule. The pyridyl group is a group obtained by losing hydrogen atom on the nitrogen atom or any carbon atom in the six-membered cyclic piperazine molecule. The morpholinyl group is a group obtained by losing hydrogen atom on the nitrogen atom or any carbon atom in the six-membered cyclic morpholine molecule.

Preferably, the functionalized organosilane has the structure shown in Formula I:

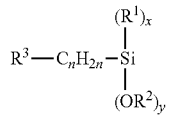

Formula I wherein n is an integer of 1~16; $R^1$ is a $C_{1~10}$ alkyl group; $R^2$ is a $C_{1~6}$ alkyl group; $R^3$ is a diethylamino, triethylamino, piperazinyl, pyridyl or morpholinyl group; x is an integer of 0~2, y is an integer of 1~3, and x+y=3. More preferably, n is an integer of 3~8; $R^1$ and $R^2$ are each independently a $C_{1~4}$ alkyl group; $R^3$ is a piperazinyl, pyridyl or morpholinyl group.

In the present invention, the alkyl group is a group formed by losing any hydrogen atom in any linear or branched saturated alkane molecule.

In the present invention, preferably, the method for synthesizing nano SAPO-34 molecular sieve comprises the following synthetic steps:

a) dissolving the functionalized organosilane in water, and then adding sequentially an aluminum source, a phosphorus source, an organic amine and an additional silicon source (i.e. organic silicon source or inorganic silicon source) to obtain a mixture with the following molar ratio (the addition amount of the functionalized organosilane and the additional silicon source is based on the molar number of $SiO_2$, the addition amount of the phosphorus source is based on the molar number of $P_2O_5$, and the addition amount of the aluminum source is based on the molar number of $Al_2O_3$):
$SiO_2$:$P_2O_5$:$Al_2O_3$:organic amine:$H_2O$=0.2~1.2:0.5~1.5:0.6~1.4:1.5~5.5:50~200;

b) crystallizing the mixture obtained from step a) for 0.4~10 days at 150~220° C.;

c) after the crystallization of step b) is completed, separating the solid product, and washing and drying it to obtain the nano SAPO-34 molecular sieve.

The above-described method may be carried out in a conventional reactor for hydrothermally synthesizing molecular sieves, such as a crystallization reactor.

Preferably, in the mixture obtained from step a), the molar ratio of the functionalized organosilane to the additional silicon source (functionalized organosilane: additional silicon source) is 1~55:10, based on the molar number of $SiO_2$. More preferably, the functionalized organosilane: additional silicon source is 1~15:3.

Preferably, in step a), the inorganic phosphorus compound is selected from at least one of orthophosphoric acid, metaphosphoric acid, phosphate and phosphite.

Preferably, in step a), the aluminum source is selected from at least one of aluminum isopropoxide, pseudoboehmite and aluminum hydroxide.

Preferably, in step a), the additional silicon source is selected from at least one of silica sol, active silica, orthosilicate and metakaolin.

Preferably, in step a), the organic amine is one or more selected from triethylamine, tetraethylammonium hydroxide, morpholine, diethylamine, di-n-propylamine and diisopropylamine. More preferably, in step a), the organic amine is selected from triethylamine (abbreviated as TEA).

Preferably, in step b), the time for the crystallization is 1~7 days.

As a preferred embodiment, the method for synthesizing nano SAPO-34 molecular sieve comprises the following steps:

1) dissolving the functionalized organosilane in water and stirring at room temperature for 4~24 hours;

2) adding subsequently an aluminum source, a phosphorus source, an organic amine and an additional silicon source to the solution from step 1) and stirring at room temperature for 1~24 hours, with the molar ratio of respective component in the mixed solution being as follows: (0.2~1.2) $SiO_2$:(0.5~1.5) $P_2O_5$:(0.6~1.4) $Al_2O_3$:(1.5~5.5) organic amine:

(50~200) H$_2$O, wherein the molar ratio of the functionalized organosilane to the additional silicon source is 1~15:3;

3) crystallizing the mixed solution of step 2) for 0.4~10 days at 150~220° C.;

4) after the crystallization of step 3), separating the solid product by centrifugation, washing it with deionized water to neutral, and drying it in air at 120° C. to obtain the nano SAPO-34 molecular sieve raw powder.

According to another aspect, the present application provides a SAPO-34 molecular sieve catalyst (or acid catalyst), wherein the SAPO-34 molecular sieve catalyst is obtained by calcining the nano SAPO-34 molecular sieve synthesized according to any of the above-described methods in air at 400~700° C.

According to yet another aspect, the present application provides the application of the SAPO-34 molecular sieve catalyst in the conversion of oxygenated compounds to olefins.

EXAMPLES

Hereinafter, the present application is illustrated in detail by way of Examples, but the present application is not limited to these Examples.

Unless specially stated otherwise, the test conditions in the present application are as follows:

Elemental composition was determined on Magix-601 type X-ray fluorescence analyzer (XRF) (Philips company).

X-ray powder diffraction phase analysis (XRD) was conducted on X'Pert PRO type X-ray diffractometer from PANalytical company of the Netherlands, Cu target, Kα radiation source (λ=0.15418 nm), voltage 40 KV, current 40 mA.

SEM morphology was analyzed on SU8020 type scanning electron microscope from the scientific instrument factory of the Chinese Academy of Sciences.

N$_2$ physical adsorption analysis was determined on Micromeritics ASAP 2020 type physical adsorption analyzer from Mike company of USA.

The functionalized organosilane and n-octyl trimethoxysilane used in the Examples were purchased from Shanghai Dibai Chemical Technology Co., Ltd. Octadecyl dimethyl trimethoxysilyl propyl ammonium chloride was purchased from Sigma Aldridge (Shanghai) Co., Ltd. As a nonrestrictive example, in Formula I, $R^1$ is methyl; $R^2$ is methyl; $R^3$ is any one of piperazinyl, pyridyl and morpholinyl groups; x=1; y=2; n=3~8; and the functionalized organosilane with $R^3$ being piperazinyl group is abbreviated as PiSi-n; the functionalized organosilane with $R^3$ being pyridyl group is abbreviated as BiSi-n; the functionalized organosilane with $R^3$ being morpholinyl group is abbreviated as MoSi-n, wherein the n takes the value of corresponding n. For example, "PiSi-3" denotes the functionalized organosilane compound with a chemical structure of n=3, $R^1$ is methyl, $R^2$ is methyl, $R^3$ is piperazinyl, x=1 and y=2 in Formula I.

Example 1

The molar ratio of respective raw materials, the crystallization condition and the elemental composition are shown in Table 1. The specific batching process is as follows:

9.28 g PiSi-3 and 71.40 g deionized water were mixed and stirred for 1 hour, then 135.64 g pseudoboehmite (72.5% Al$_2$O$_3$, mass percentage content), 34.58 g phosphoric acid (85% H$_3$PO$_4$, mass percentage content), 20.24 g triethylamine and 8.33 g tetraethyl orthosilicate were added sequentially, followed by being stirred and aged for 24 hours. Subsequently, the gel mixture was transferred into a stainless steel reactor. The molar ratio of respective component in the synthesis system is 0.8 SiO$_2$:1.5P$_2$O$_5$:0.8 Al$_2$O$_3$:2 TEA:80 H$_2$O, and the molar ratio of PiSi-3 to tetraethyl orthosilicate is 1:1.

After the reactor was put into an oven, the programmed temperature was raised to 200° C., and the static crystallization was carried out for 48 h. After the reaction, the solid product was centrifuged, washed repeatedly with deionized water, and dried in air at 120° C. to obtain the nano SAPO-34 molecular sieve sample.

Figure 3:
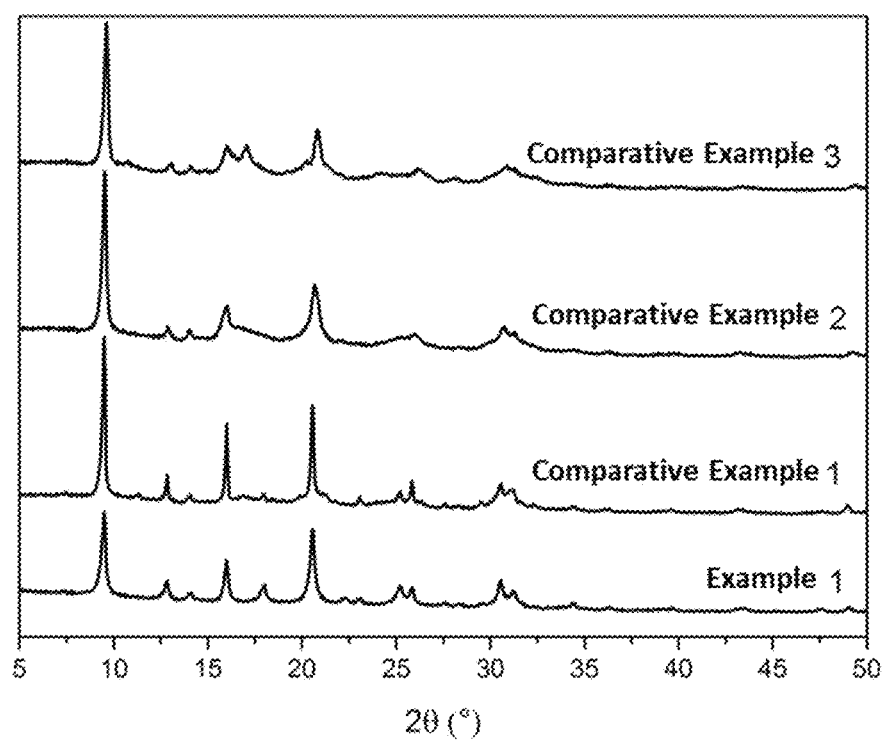
FIG. 3 is a XRD diffraction pattern of the SAPO-34 molecular sieve samples obtained according to Example 1 and Comparative Examples 1~3 of the present application.

The morphology of the obtained sample was characterized by scanning electron microscopy. The electron microscopic photograph of the sample is shown in FIG. 1. The obtained sample assumes spherical micron particles aggregated from strip-like nanocrystals. The particle size distribution of the strip-like nanocrystals is between 50 nm~200 nm. The results of XRD analysis are shown in FIG. 3 and Table 2. The results show that the synthesized product has a pure SAPO-34 crystal phase.

The elemental composition of the obtained sample was analyzed by XRF. The results are shown in Table 1.

Comparative Example 1

The batching proportion and synthesis process were the same as in Example 1, but no piperazine-based organosilane PiSi-3 was added, and the piperazine-based organosilane PiSi-3 in Example 1 was replaced by tetraethyl orthosilicate with SiO$_2$ of the same molar number.

Figure 2:
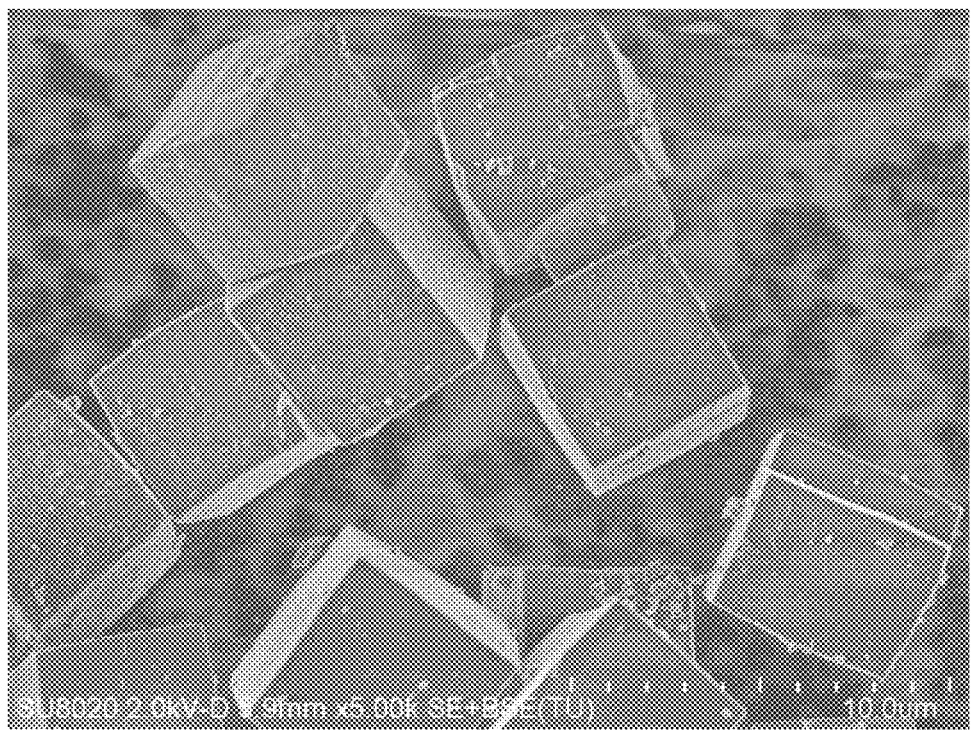
FIG. 2 is a SEM image of the SAPO-34 molecular sieve sample obtained according to Comparative Example 1 of the present application.

The morphology of the sample obtained in Comparative Example 1 was characterized by scanning electron microscopy. The electron microscopic photograph of the sample is shown in FIG. 2, indicating that the sample assumes smooth cubic large grains with a particle size of about 5 μm.

The XRD diffraction pattern of the raw powder of the sample in Comparative Example 1 is also shown in FIG. 3. The results show that the sample in Comparative Example 1 has obvious broad peaks at 16-17.5°, 21-22.5° and 30-32°, indicating that the sample in Comparative Example 1 is a SAPO-34/-18 eutectic crystal with a relatively higher content of SAPO-34 (for the specific content analysis for respective crystal phase, referring to the website of International Molecular Sieve Association, http://www.iza-online.org/default.htm).

Comparative Example 2

The batching proportion and synthesis process were the same as in Example 1, but no piperazine-based organosilane PiSi-3 was added, and the piperazine-based organosilane PiSi-3 in Example 1 was replaced by a quaternary ammonium surfactant of octadecyl dimethyl trimethoxysilyl propyl ammonium chloride (TPOAC) with SiO$_2$ of the same molar number.

The XRD diffraction pattern of the raw powder of the sample in Comparative Example 2 is shown in FIG. 3. The diffraction pattern indicates that the sample using TPOAC in Comparative Example 2 contains a SAPO-18 eutectic crystal.

Comparative Example 3

The batching proportion and synthesis process were the same as in Example 1, but no piperazine-based organosilane PiSi-3 was added, and the piperazine-based organosilane PiSi-3 in Example 1 was replaced by n-octyl trimethoxysilane, which has no organic functional groups, with $P_2O_5$ of the same molar number.

The XRD diffraction pattern of the raw powder of the sample in Comparative Example 3 is shown in FIG. 3. The diffraction pattern indicates that the sample using n-octyl trimethoxysilane in Comparative Example 3 contains a SAPO-18 eutectic crystal.

Examples 2~12

The specific batching proportions and crystallization conditions are shown in Table 1, and the specific batching processes are the same as in Example 1.

The results of XRD analysis for the samples obtained in Examples 2~12 are similar to those in table 2, that is, the positions and shapes of the peaks are the same, and the relative peak intensities of the peaks fluctuate within a range of ±10% according to the variation in synthetic condition, indicating that the synthesized products have the characteristics of SAPO-34 structure.

The XRF elemental compositions of the samples in Examples 2~12 were analyzed, and the results are shown in Table 1.

The morphologies of the samples in Examples 2~12 were analyzed by scanning electron microscopy, and the obtained electron microscopic photographs are similar to that in FIG. 1.

TABLE 1

Synthesis batching, crystallization condition and elemental composition of molecular sieves

| Example | Organosilane and $SiO_2$ molar number | Additional silicon source and $SiO_2$ molar number | Phosphorus source and $P_2O_5$ molar number | Aluminum source and $Al_2O_3$ molar number | Organic amine molar number | $H_2O$ molar number | Crystallization temperature | Crystallization time | Elemental composition analysis result of product |
|---|---|---|---|---|---|---|---|---|---|
| 1 | PiSi-3 0.04 mol | tetraethyl orthosilicate 0.04 mol | orthophosphoric acid 0.15 mol | pseudoboehmite 0.08 mol | 0.20 mol | 8.0 mol | 200° C. | 48 h | $(Si_{0.14}Al_{0.45}P_{0.41})O_2$ |
| 2 | BiSi-3 0.02 mol | silica sol 0.06 mol | orthophosphoric acid 0.12 mol | aluminum isopropoxide 0.12 mol | 0.45 mol | 5.5 mol | 210° C. | 60 h | $(Si_{0.15}Al_{0.45}P_{0.40})O_2$ |
| 3 | MoSi-4 0.01 mol | carbon-white 0.01 mol | orthophosphoric acid 0.05 mol | aluminum isopropoxide 0.06 mol | 0.35 mol | 15.0 mol | 180° C. | 96 h | $(Si_{0.06}Al_{0.48}P_{0.46})O_2$ |
| 4 | BiSi-7 0.04 mol | tetraethyl orthosilicate 0.08 mol | orthophosphoric acid 0.08 mol | aluminum hydroxide 0.12 mol | 0.15 mol | 20.0 mol | 200° C. | 24 h | $(Si_{0.17}Al_{0.45}P_{0.38})O_2$ |
| 5 | PiSi-4 0.05 mol | carbon-white 0.03 mol | metaphosphoric acid 0.10 mol | aluminum hydroxide 0.14 mol | 0.20 mol | 5.0 mol | 190° C. | 120 h | $(Si_{0.04}Al_{0.55}P_{0.41})O_2$ |
| 6 | PiSi-5 0.01 mol | silica sol 0.03 mol | metaphosphoric acid 0.08 mol | pseudoboehmite 0.08 mol | 0.55 mol | 10.0 mol | 150° C. | 168 h | $(Si_{0.08}Al_{0.49}P_{0.43})O_2$ |
| 7 | MoSi-8 0.02 mol | silica sol 0.04 mol | ammonium hydrogen phosphate 0.09 mol | pseudoboehmite 0.12 mol | 0.20 mol | 12.0 mol | 210° C. | 48 h | $(Si_{0.10}Al_{0.47}P_{0.43})O_2$ |
| 8 | PiSi-6 0.05 mol | tetraethyl orthosilicate 0.06 mol | metaphosphoric acid 0.05 mol | aluminum isopropoxide 0.12 mol | 0.28 mol | 9.0 mol | 200° C. | 96 h | $(Si_{0.18}Al_{0.45}P_{0.37})O_2$ |
| 9 | MoSi-6 0.10 mol | carbon-white 0.02 mol | Ammonium dihydrogen phosphate 0.12 mol | pseudoboehmite 0.10 mol | 0.35 mol | 16.0 mol | 220° C. | 12 h | $(Si_{0.19}Al_{0.44}P_{0.37})O_2$ |
| 10 | PiSi-3 0.03 mol | tetraethyl orthosilicate 0.04 mol | Ammonium dihydrogen phosphate 0.10 mol | pseudoboehmite 0.12 mol | 0.40 mol | 20.0 mol | 200° C. | 48 h | $(Si_{0.12}Al_{0.46}P_{0.42})O_2$ |
| 11 | PiSi-4 0.05 mol | silica sol 0.05 mol | orthophosphoric acid 0.10 mol | aluminum hydroxide 0.07 mol | 0.30 mol | 10.5 mol | 190° C. | 24 h | $(Si_{0.13}Al_{0.48}P_{0.39})O_2$ |
| 12 | BiSi-8 0.02 mol | carbon-white 0.04 mol | metaphosphoric acid 0.08 mol | aluminum isopropoxide 0.10 mol | 0.50 mol | 16.0 mol | 160° C. | 36 h | $(Si_{0.10}Al_{0.46}P_{0.44})O_2$ |

TABLE 2

XRD results of sample obtained in Example 1

| No. | 2θ | d(Å) | 100*I/I$_0$ |
|---|---|---|---|
| 1 | 9.493116 | 9.31665 | 92.35 |
| 2 | 12.84392 | 6.89261 | 28.9 |
| 3 | 13.99115 | 6.32991 | 6.72 |
| 4 | 15.99025 | 5.54277 | 47.72 |
| 5 | 17.93924 | 4.94473 | 20.31 |
| 6 | 20.55734 | 4.32053 | 100 |
| 7 | 22.18501 | 4.00708 | 6.43 |
| 8 | 23.05264 | 3.8582 | 6.76 |
| 9 | 25.16641 | 3.53873 | 23.32 |
| 10 | 25.85266 | 3.44633 | 25.98 |
| 11 | 27.61156 | 3.2302 | 4.38 |
| 12 | 29.48936 | 3.02908 | 3.57 |
| 13 | 30.5581 | 2.92553 | 41.07 |
| 14 | 31.15588 | 2.87075 | 20.74 |
| 15 | 34.45969 | 2.60271 | 8.54 |
| 16 | 36.22659 | 2.47972 | 3.39 |
| 17 | 39.63702 | 2.27387 | 3.8 |
| 18 | 43.40979 | 2.08459 | 5.02 | wherein θ represents the XRD diffraction angle, d represents the interplanar crystal spacing, I represents the relative diffraction peak intensity, and I$_0$ represents the relative maximum diffraction peak intensity.

Example 13

The samples obtained in Examples 1~4 and Comparative Example 1 were calcined in air at 600° C. for 4 hours, and then subject to N$_2$ physical adsorption analysis. The results are shown in Table 3. From the results in Table 3, it can be seen that the samples obtained in Examples 1 to 4 have significantly increased external specific surface area and mesoporous volume, compared with the data from Comparative Example 1.

TABLE 3

Specific surface area and pore volume of samples

| Sample | Specific surface area (m$^2$/g) | | | V$_{micropore}$ (cm$^3$/g) | V$_{mesopore}$$^b$ (cm$^3$/g) |
|---|---|---|---|---|---|
| | S$_{BET}$ | S$_{micropore}$$^a$ | S$_{mesopore}$ | | |
| Comparative Example 1 | 572 | 566 | 6 | 0.24 | 0.01 |
| Example 1 | 577 | 478 | 99 | 0.22 | 0.17 |
| Example 2 | 577 | 475 | 102 | 0.22 | 0.18 |
| Example 3 | 582 | 493 | 89 | 0.23 | 0.13 |
| Example 4 | 597 | 488 | 109 | 0.22 | 0.17 |

$^a$calculated by t-plot method
$^b$calculated by BJH method wherein V$_{micropore}$ represents the volume of micropores in material, S$_{BET}$ represents the BET surface area of material, S$_{micropore}$ represents the specific surface area of micropores in material, and S$_{mesopore}$ represents the specific surface area of mesopores in material

Example 14

The samples obtained in Examples 1~4 and Comparative Example 1 were calcined in air at 600° C. for 4 hours, and then tableted and crushed to 40~60 meshes. 0.3 g of each sample was charged into a fixed bed reactor and subject to MTO reaction for evaluation. The sample was activated for 1 hour at 550° C. under nitrogen, and then cooled to 450° C. for the reaction. Methanol was carried by nitrogen. The flow rate of nitrogen was 42 ml/min, and the mass hourly space velocity of methanol was 4 h$^{-1}$. The reaction products were analyzed by on-line gas chromatography (Varian 3800, FID detector, capillary column PoraPLOT Q-HT). The results are shown in Table 4.

TABLE 4

Reaction results of samples for conversion of methanol to olefins

| Sample | Service life (min)$^a$ | Selectivity (mass %) | | | | | | |
|---|---|---|---|---|---|---|---|---|
| | | CH$_4$ | C$_2$H$_4$ | C$_2$H$_6$ | C$_3$H$_6$ | C$_3$H$_8$ | C$_2$H$_4$ + C$_3$H$_6$$^b$ | C$_4$-C$_6$ |
| Comparative Example 1 | 160 | 3.89 | 44.40 | 0.72 | 32.12 | 1.81 | 76.51 | 17.06 |
| Example 1 | 330 | 2.04 | 49.37 | 0.39 | 33.65 | 0.60 | 83.02 | 13.92 |
| Example 2 | 300 | 2.24 | 50.15 | 0.46 | 32.93 | 0.67 | 83.07 | 13.54 |
| Example 3 | 460 | 1.23 | 50.19 | 0.41 | 34.83 | 0.74 | 85.02 | 9.87 |
| Example 4 | 360 | 2.24 | 49.87 | 0.47 | 32.88 | 0.76 | 82.76 | 13.76 |

$^a$The reaction time during which the conversion of methanol was 100%.
$^b$The highest (ethylene + propylene) selectivity when the conversion of methanol was 100%

Although the present application is disclosed with preferred embodiments as above, it does not mean that the present application is limited by them. Without departing from the inventive concept of the present application, any slight variations and modifications made by those skilled in the art who is familiar with this major by utilizing the above disclosures are all equal to the equivalent embodiments and fall into the scope of the technical solutions of the present application.

The invention claimed is:

1. A method for synthesizing nano SAPO-34 molecular sieve, the method comprising: synthesizing the nano SAPO-34 molecular sieve by hydrothermal method in the presence of a functionalized organosilane, the functionalized organosilane having the structure shown in Formula I:

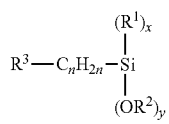

Formula I wherein n is an integer ranging from 1 to 16; $R^1$ is selected from $C_{1\sim 10}$ alkyl group; $R^2$ is selected from $C_{1\sim 6}$ alkyl group; $R^3$ is selected from diethylamino, triethylamino, piperazinyl, pyridyl or morpholinyl group; x is an integer ranging from 0 to 2, y is an integer ranging from 1 to 3, and x+y=3.

2. A method for preparing a SAPO-34 molecular sieve catalyst, comprising calcining the nano SAPO-34 molecular sieve synthesized by the method according to claim 1 in air at a temperature in a range from 400 to 700° C. to obtain the SAPO-34 molecular sieve catalyst.

3. The method according to claim 1, wherein in the Formula I, n is an integer ranging from 3 to 8; $R^1$ and $R^2$ are each independently selected from $C_{1\sim 4}$ alkyl group; $R^3$ is selected from piperazinyl, pyridyl or morpholinyl group.

4. A method for preparing a SAPO-34 molecular sieve catalyst, comprising calcining the nano SAPO-34 molecular sieve synthesized by the method according to claim 3 in air at a temperature in a range from 400 to 700° C. to obtain the SAPO-34 molecular sieve catalyst.

5. The method according to claim 1, wherein the method comprises the following steps:
 a) dissolving the functionalized organosilane in water, and then adding sequentially an aluminum source, a phosphorus source, an organic amine and an additional silicon source to obtain a mixture with the following molar ratio:
 $SiO_2:P_2O_5:Al_2O_3$:organic amine:$H_2O$=0.2~1.2:0.5~1.5: 0.6~1.4:1.5~5.5:50~200;
 b) crystallizing the mixture obtained from step a) for a crystallization time in a range from 0.4 to 10 days at a crystallization temperature in a range from 150 to 220° C.;
 c) after the crystallization of step b), separating the solid product, and washing and drying it to obtain the nano SAPO-34 molecular sieve.

6. The method according to claim 5, wherein the molar ratio of the functionalized organosilane to the additional silicon source in the mixture obtained from step a) is 1~55:10, based on the molar number of $SiO_2$.

7. A method for preparing SAPO-34 molecular sieve catalyst, comprising calcining the nano SAPO-34 molecular sieve synthesized by the method according to claim 6 in air at a temperature in a range from 400 to 700° C. to obtain the SAPO-34 molecular sieve catalyst.

8. The method according to claim 5, wherein in step a), the phosphorus source is one or more selected from orthophosphoric acid, metaphosphoric acid, phosphate and phosphite; the aluminum source is one or more selected from aluminum salt, active alumina, alkoxy aluminum and metakaolin; the additional silicon source is one or more selected from silica sol, active silica, orthosilicate and metakaolin.

9. A method for preparing SAPO-34 molecular sieve catalyst, comprising calcining the nano SAPO-34 molecular sieve synthesized by the method according to claim 8 in air at a temperature in a range from 400 to 700° C. to obtain the SAPO-34 molecular sieve catalyst.

10. The method according to claim 5, wherein in step a), the organic amine is one or more selected from triethylamine, tetraethylammonium hydroxide, morpholine, diethylamine, di-n-propylamine and diisopropylamine.

11. A method for preparing SAPO-34 molecular sieve catalyst, comprising calcining the nano SAPO-34 molecular sieve synthesized by the method according to claim 10 in air at a temperature in a range from 400 to 700° C. to obtain the SAPO-34 molecular sieve catalyst.

12. The method according to claim 5, wherein in step a), the organic amine is triethylamine.

13. A method for preparing SAPO-34 molecular sieve catalyst, comprising calcining the nano SAPO-34 molecular sieve synthesized by the method according to claim 12 in air at a temperature in a range from 400 to 700° C. to obtain the SAPO-34 molecular sieve catalyst.

14. The method according to claim 5, wherein in step b), the crystallization time is in a range from 1 to 7 days.

15. A method for preparing SAPO-34 molecular sieve catalyst, comprising calcining the nano SAPO-34 molecular sieve synthesized by the method according to claim 14 in air at a temperature in a range from 400 to 700° C. to obtain the SAPO-34 molecular sieve catalyst.

16. A method for preparing a SAPO-34 molecular sieve catalyst, comprising calcining the nano SAPO-34 molecular sieve synthesized by the method according to claim 5 in air at a temperature in a range from 400 to 700° C. to obtain the SAPO-34 molecular sieve catalyst.

* * * * *